(12) United States Patent
Shah et al.

(10) Patent No.: US 8,281,151 B2
(45) Date of Patent: Oct. 2, 2012

(54) AUDITOR ASSISTED EXTRACTION AND VERIFICATION OF CLIENT DATA RETURNED FROM A STORAGE PROVIDED WHILE HIDING CLIENT DATA FROM THE AUDITOR

(75) Inventors: Mehul A. Shah, Saratoga, CA (US); Ram Swaminathan, Cupertino, CA (US)

(73) Assignee: Hewlett-Packard Development Company L. P., Houston, TX (US)

( * ) Notice: Subject to any disclaimer, the term of this patent is extended or adjusted under 35 U.S.C. 154(b) by 842 days.

(21) Appl. No.: 12/243,134

(22) Filed: Oct. 1, 2008

(65) Prior Publication Data
US 2010/0083001 A1    Apr. 1, 2010

Related U.S. Application Data

(60) Provisional application No. 61/123,557, filed on Apr. 9, 2008.

(51) Int. Cl.
H04L 29/06    (2006.01)

(52) U.S. Cl. .................. 713/187; 713/185; 711/216

(58) Field of Classification Search .............. 713/185, 713/187; 711/216
See application file for complete search history.

(56) References Cited

U.S. PATENT DOCUMENTS

| | | | | |
|---|---|---|---|---|
| 7,000,118 | B1 * | 2/2006 | Murthy et al. | 713/185 |
| 2006/0184764 | A1 * | 8/2006 | Osaki | 711/216 |
| 2006/0206932 | A1 * | 9/2006 | Chong | 726/10 |

* cited by examiner

Primary Examiner — Jeffrey Pwu
Assistant Examiner — Michael D Anderson

(57) ABSTRACT

Various approaches for extracting client's data from a storage provider are presented. In one approach, an auditor is initialized with a verification data set that confirms that an initial version of a data set stored by the storage provider is intact. The auditor extracts a second version of the data set from the storage provider; the second version hides information specified by the data set from the auditor. The auditor determines whether the second version matches the initial version. The second version is returned to the client if the initial version matches the second version. The auditor is prevented from recovering the information specified by the data set using the state information, and the client need not store any state information related to the initial and second versions needed to recover the information specified by the data set. If the initial version does not match the second version, the auditor outputs data indicative of data corruption.

19 Claims, 8 Drawing Sheets

AUDITOR ASSISTED EXTRACTION AND VERIFICATION OF CLIENT DATA RETURNED FROM A STORAGE PROVIDED WHILE HIDING CLIENT DATA FROM THE AUDITOR

CROSS REFERENCE TO RELATED APPLICATIONS

This Application claims the benefit of U.S. Provisional Application Ser. No. 61/123,557, filed Apr. 9, 2008 titled "Auditor Assisted Extraction And Verification Of Client Data Returned From A Storage Provided While Hiding Client Data From The Auditor" which is hereby incorporated by reference herein as if reproduced in full below.

FIELD OF THE INVENTION

The present disclosure generally relates to methods for extracting data from a storage provider through a third-party auditor and returning the data to the client, such that the auditor can verify the data's integrity without recovering its contents and that the client can recover the contents without maintaining any state derived from the data.

BACKGROUND

A growing number of online service providers (Amazon, Yahoo!, Google, Snapfish, Mozy.com, etc.) aim to profit by storing and maintaining lots of valuable client data. Example uses of this storage include online backup, email, photo sharing, and video hosting. Many of these storage providers offer a small amount of "teaser" storage for free, and charge for larger, upgraded versions of the service.

Studies of deployed, large-scale storage systems show that no storage provider is completely reliable; all have the potential to lose or corrupt client data. Today, a client that wants to rely on these services must make an uneducated choice. Clients have only negative newsworthy anecdotes on which to base their decision, and service popularity or "brand name" is not a positive indicator of reliability. To know if their data is safe, clients must either blindly trust the storage provider or retrieve the hosted data and verify its integrity. To verify integrity, clients must maintain signatures of the hosted data, a task that is difficult for typical clients, e.g. home users. Neither solution is satisfactory. Unfortunately, to date, there are no fair and explicit mechanisms for making storage providers accountable for data loss.

DETAILED DESCRIPTION

Figure 1:
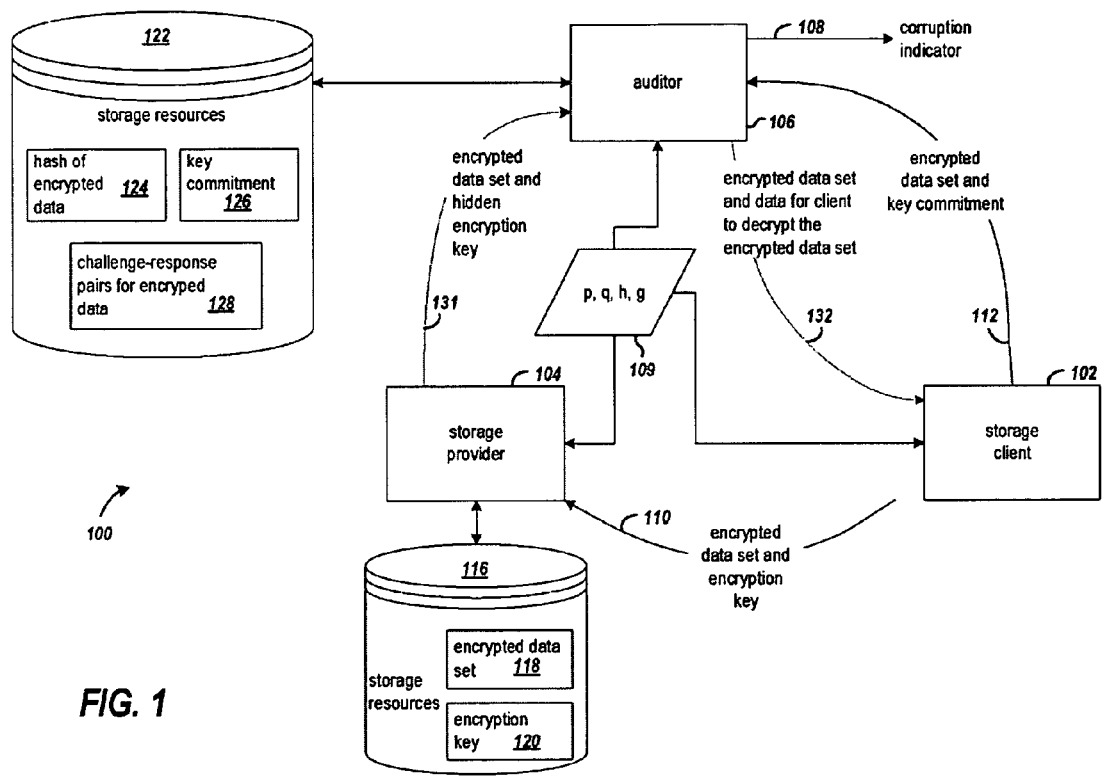
FIG. 1 is a block diagram that shows the flow of data between a client, a storage provider, and an auditor in accordance with an embodiment of the invention.

The embodiments of the present invention provide storage service accountability through independent, third-party arbitration. The client and storage provider enter into an agreement or contract for storing data in which the storage provider gives some type of payment for data loss, e.g. free prints, refunds, or insurance. In such an agreement, the two parties have conflicting incentives. The service provider, whose goal is to make a profit and maintain a reputation, has an incentive to hide data loss. On the other hand, clients are terribly unreliable, e.g. casual home users. Clients may innocently (but incorrectly) or fraudulently claim loss to get paid. Thus, an independent, third-party ("auditor") is called upon to arbitrate: confirm whether stored and retrieved data are intact and return the original data to the client.

Unfortunately, storage providers are often reluctant to reveal their data to external parties for two reasons. First, storage providers have legal, e.g. HIPAA, and social incentives to maintain clients' privacy. Second, client data and its derivatives have value, so storage providers want to protect their business assets from competitors. Some efficient, challenge-response protocols have been proposed for auditing storage providers, but such protocols have the potential to reveal some information to the auditor. Moreover, these protocols cannot be used to arbitrate data retention contracts without revealing client data to the auditor or burdening the client to store secret keys.

To address these concerns, the embodiments of present invention provide a set of third-party data retrieval ("extraction") protocols that return the data to the client through a third-party. The protocols allow the third party to verify that the data is intact, but never reveal the data contents to the third party. Moreover, the client does not need to maintain any state such as hashes or secret keys that depend on the stored data.

The extraction protocols involve three parties: the storage provider, the client, and the auditor. To hide the underlying data from the auditor, the protocols represent the original data with two pieces: an encryption key and the encrypted version of the original data. The extraction protocols treat these two pieces independently. To relieve the client of the burden of maintaining any state, the protocols store these two pieces with storage providers. The protocols ensure that the auditor never learns anything about the underlying data and that the client need not maintain any state dependent on the stored data.

In one embodiment, it is assumed that both the encrypted data and encryption key are maintained by a single storage provider. This setting offers some advantages. Placing the encryption key with the storage provider ensures reliable and private storage of the key since the storage provider already understands and presumably implements best practices for maintaining clients' data and privacy. In addition, the storage provider has the option to store the original plaintext data and generate the encrypted data as needed or vice-versa or maintain both. By having access to the original data, the storage provider may provide value-added features beyond storage such as browsing or searching functions.

In another embodiment, the encrypted data and encryption key may be maintained in other ways among various independent storage providers that allow privacy-preserving extraction. For example, to hide the underlying data from all external parties (including the storage provider), a client can separate the encrypted data and encryption key between two independent (non-colluding) storage providers that allow and support the extraction described herein.

The general approaches described herein are generally composed of two parts. The first part verifies and extracts the encrypted data and the second part verifies and extracts the encryption key. For ease of exposition, the description assumes both the encrypted data and corresponding encryption key are maintained by the storage provider.

The following abbreviations appear in the following description in association with the operations performed by a client (storage client), a storage provider, and an auditor.

A—auditor
C—client, a user that stores data with the storage provider
$E_K(M)$—symmetric-key encryption of M (e.g. using AES) with key K
h—generator of $Z^*_p$
g—generator of the quadratic residues of $Z^*_p$, $g=h^2$ (mod p)
$H(E_K(M))$—one-way, collision-free hash of $E_K(M)$
$HM_i$—one-way, collision-free hash that depends on full-knowledge of $R_i$ and $E_K(M)$
HMAC—keyed hash message authentication code used to implement $HM_i$
K—encryption key
M—data object
p and q—prime numbers larger than encryption key, K and such that p=2q+1
$R_i$—the $i^{th}$ random number
RC—retention contract that identifies the C and S and contract terms
S—storage provider
$Z_p^*$—multiplicative cyclic group of order p In extraction, the encrypted data and a "blinded" version of the encryption key are passed to the auditor. The auditor checks their integrity and forwards them to the customer. With these values, the customer can then recover the original data. Several protocols are described for extraction of the encryption key, each with different assumptions. In some of these, either or both, the storage provider or client may send bogus values that can prevent extraction from completing properly. These protocols allow the auditor to identify which party is sending the bogus values and therefore obstructing extraction.

FIG. 1 is a block diagram that shows the flow of data between a client 102, a storage provider 104, and an auditor 106. The client 102 represents the party who claims ownership of a data set for which the client has contracted with the storage provider 104 to provide retentive storage of the encrypted data and encryption key. The storage provider supplies services for long term retention of clients' data sets, including for example, disaster recovery, and also protects the data sets from unauthorized exposure to third parties. The auditor 106, in response to a request from the client, for example, assists in extraction of the data from the storage provider to the client. If the data set is corrupt, the auditor reports the corruption, for example, to the client (line 108). Otherwise, the auditor returns the data to the client. For ease of illustration, the blocks 102, 104, and 106 represent both the parties responsible for performing the designated functions as well as the hardware components and software processes that actually perform the functions.

The embodiments of the invention assume that all parties communicate through secure, reliable, and authenticated channels. Furthermore, the client, storage provider, and auditor have previously agreed on sufficiently large prime numbers, p and q, such that p=2q+1. They have also agreed on a value h that is a generator of the cyclic group $Z_p^*$. Then, $g=h^2$ (mod p) is a quadratic residue of the cyclic group, $Z_p^*$. The value g will generate all the quadratic residues of $Z_p^*$, which form a subgroup of $Z_p^*$ of size q. These values can be reused in all phases and for other instances of this protocol. The data set 109 includes p, q, h, and g and is accessible to each of the client 102, storage provider 104, and auditor 108. The data set is maintained by the auditor and storage service and may be replicated and stored with other publically accessible storage providers for additional reliability.

The cyclic group $Z_p^*$ contains the set of integers {1 . . . p−1}. If p=2q+1 and q is a prime, then the value g generates all the elements y in $Z_p^*$ such that $y=x^2$ (mod p) for some x also in $Z_p^*$. Stated alternatively, $g^x$ is a quadratic residue of $Z_p^*$ for all 1<=X<=q, and if X·Y, then $g^x \cdot g^y$. The embodiments of the invention use multiplication and exponentiation operations in this cyclic subgroup of quadratic residues to verify and extract an encryption key, K, without revealing K in plaintext; thus, q must be larger than K. The encryption key verification methods rely on the hardness of the discrete-log assumption in this subgroup. This assumption states that given a generator, g, and element W of a cyclic group of size q it is computationally infeasible to compute X such that $W=g^X$ for large q. Hereafter, computation involving the encryption key is assumed to be modulo p unless otherwise stated.

The embodiments of the invention include an initialization phase and an extraction phase. These phases described herein are example embodiments out of possibly many embodiments. During the initialization phase (shown in FIG. 2) the storage provider and the auditor are provided with the necessary data for each to fulfill their responsibilities with respect to the client. That is, the storage provider is provided with the encrypted data set and the corresponding encryption key that it is to retain for the client (line 110), and the auditor is provided with an encrypted data set, along with a key commitment, $g^K$ (mod p), (line 112), that fixes a value representative of the key without revealing the actual key to the auditor. These values are provided by the client to the storage provider and auditor at initialization. A retention contract (not shown) is also provided to both the storage provider and to the auditor. The retention contract identifies the client (or "user") and the storage provider and terms of the contract. To verify that the client and storage provider agree at the outset, the three parties engage in an initialization protocol as detailed in FIG. 2.

For fulfilling its obligations to the client, the storage provider stores in its storage resources 116, the encrypted data set 118 and the associated encryption key 120. It will be appreciated that the encrypted data set and encryption key may be stored in the same storage resources by the same storage provider, stored in separate storage resources by the same storage provider, or stored separately by different storage providers depending on implementation requirements. To correctly extract the encrypted data and encryption key, the auditor stores and maintains in its storage resources 122, a hash value 124 of the encrypted data set and the key commitment 126. For optional verification in another embodiment, which is described along with FIGS. 7-8, a plurality of challenge response pairs 128 may also be stored.

The phase in which the client obtains the encrypted data and encryption key from the strorage provider is referred to as the extraction phase. In the extraction phase, the auditor is provided with a data set from which the auditor determines whether the encrypted data set and the encryption key are intact, as shown by line 131. The data set is provided to the auditor by the storage provider 104. The data set provided to the auditor hides the encryption key from the auditor. If the auditor verifies that the data set is intact, in one or more embodiments the auditor provides data to the client which allows the client to decrypt the encrypted data set.

Those skilled in the art will recognize various alternative computing and storage architectures may be suitable for the data processing arrangements that implement the functions of the storage client 102, storage provider 104, auditor 106 and associated storage resources 116 and 122. Such computing architectures generally include one or more processors, main memory, cache memory, and input/output (I/O) and network subsystems. The processors, memory, and subsystems may be arranged as a symmetric multiprocessing system, a parallel processing system, a distributed processing system, or a clustered computing arrangement according to application requirements. The retentive storage may include magnetic, optical, or solid-state storage, depending on application requirements, and be arranged in local storage, network attached storage, or in a storage area network. Those skilled in the art will recognize that different combinations of different ones of the aforementioned computing and storage architectures may be used in hosting the processes described herein for different applications.

Figure 2:
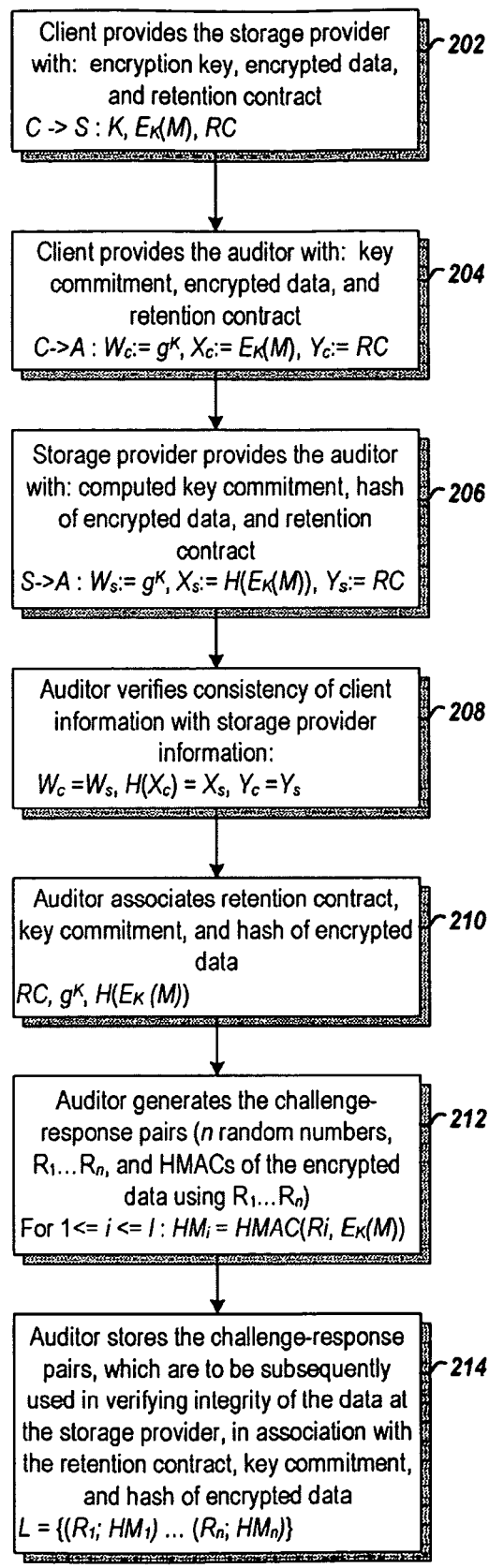
FIG. 2 is a flowchart of an example process for initializing the auditor in accordance with an embodiment of the invention.

FIG. 2 is a flowchart of an example process for initializing the auditor in accordance with an embodiment of the invention. At step 202, the client provides the storage provider with the encryption key (can be chosen by the client), the encrypted data set and the retention contract, denoted as: C−>S:K, $E_K(M)$, RC. The data can be encrypted using any well-known, cryptographically secure, symmetric-key encryption scheme, e.g. AES.

At step 204 the client provides the auditor with the client-generated key commitment (i.e., the cyclic group generator raised to the value of the encryption key ($g^K$)), the encrypted data set, and the retention contract, denoted as: C−>A: $W_c := g^K$, $X_c := E_K(M)$, $Y_c := RC$. In the notation, the operand on the left side of the :=operator specifies the variable bound to the operand that is on the right side. At step 206, the storage provider provides the auditor with the storage provider-generated key commitment, a hash of the encrypted data set, and the retention contract, denoted as: S−>A:$W_s := g^K$, $X_s := H(E_K(M))$, $Y_s := RC$. The hash function H( ) can be any well known one-way, collision free, cryptographically secure hash function, e.g. SHA-2. The retention contract is a document that indicates the terms of the service agreement between the client and service provider. For example, it may include the names of the parties and terms and conditions for payments and penalties.

To assure that the client and the storage provider agree at the outset about the stored information, at step 208 the auditor verifies consistency of client information with storage provider information: $W_c = W_s$, $H(X_c) = X_s$, $Y_c = Y_s$. If any of the client-supplied information does not match the storage provider-supplied information, the initialization process may be aborted and the client and storage provider notified of the inconsistent information.

Assuming the information matches, at step 210 the auditor associates the retention contract information with the key commitment and the hash of the encrypted data set, denoted as: RC, $g^K$, $H(E_K(M))$. The key commitment is later used to verify that the storage provider has the correct key. The hash is later used to verify the integrity of the encrypted data.

At step 212, the auditor optionally generates the challenge codes and expected response codes for the challenge-response pairs for remote verification. The challenge-response pairs are not necessary for extraction but are used for optional verification as described below. The auditor generates n random numbers, $R_1, \ldots, R_n$, as the challenges, and computes n hashes, $HM_1, \ldots, HM_n$, as the responses. Each of these $HM_i$ are one-way, collision-free functions of both $R_i$ and $E_K(M)$, and require knowledge of the entirety of $R_i$ and $E_K(M)$. These hashes will be used in the verification phase to ensure the integrity of the encrypted data. In an example embodiment, the hashes are generated using keyed-hash message authentication codes (HMACs), i.e. $HM_i = HMAC(R_i; E_K(M))$. The HMAC's underlying hash function can be any cryptographically secure message digest, e.g. SHA-2. The response codes cannot be computed, for example, by the storage provider, unless both $R_i$ and $E_K(M)$ are known in their entirety. To avoid the storage overhead of the encrypted data, the auditor may discard the encrypted data and store the challenge-response pairs: $L = \{(R_1; HM_1), \ldots, (R_n; HM_n)\}$. At step 214, the auditor stores the challenge-response pairs in association with the retention contract, key commitment, and hash of encrypted data. Those skilled in the art will recognize that the number of challenge-response pairs may be as many as is desirable to satisfy implementation restrictions and requirements.

In the extraction phase, the auditor verifies that the encrypted data returned to the client is the same as when that encrypted data was initially provided to the storage provider. Extraction starts with the storage provider returning the encrypted data and encryption key to the client. The data is returned to the client first because, typically, both the client and storage provider are non-faulty and the auditor only needs to confirm that the returned data are intact. In one embodiment, the auditor optionally uses a privacy-preserving verification protocol (FIG. 7) with the client to ensure integrity. One possible verification protocol checks the integrity of the encrypted data and the encryption key as described later in FIGS. 7 and 8. If the data is intact the client does not contest the integrity of the data. This verification step is optional since it only speeds up extraction in the case that both parties are honest. A client may optionally skip verification and use the protocol shown in FIGS. 4-6 and described below.

If verification of returned data at the client fails, without further information the auditor may be uncertain whether the client or the storage provider is faulty. For example, the storage provider could have returned incorrect encrypted data, or the client may be incorrectly claiming data loss. The process for extracting data at the storage provider may malfunction, e.g. during transfer the network may randomly lose or transpose some bits. On the other hand, a client might have faulty verification software or may falsely claim data loss in hopes of seeking damages.

To arbitrate such cases, another protocol involves the auditor in returning the encrypted data to the client. In this extraction protocol, the encrypted data and a "blinded" version of the encryption key are passed to the auditor. The auditor checks their integrity and forwards them to the client. With these values, the client can then recover the original data.

Several alternative protocols are presented for extraction of the encryption key, and each protocol is based on a different set of assumptions.

The completeness, soundness, and privacy-preserving properties of the extraction protocol are as follows. For completeness, if the storage provider returns the original copies, the auditor accepts and forwards the encrypted data to the client and forwards enough information for the client to efficiently compute the encryption key.

For soundness, there is negligible probability of the auditor accepting corrupted encrypted data or a corrupted encryption key from the storage provider, even if only a single bit is incorrect. In some protocols, the auditor relies on responses from the client to determine whether the storage provider lost data or the client is faulty. In such case, there is a high probability of the auditor rejecting the client's responses if the client attempts to implicate the storage provider.

For preserving privacy, the strength of the encryption scheme protects all the bits of the encrypted data. For protection of the key, it is assumed that if the key cannot be recovered in its entirety, the data is private from the auditor. The key extraction protocols described herein ensure this property.

Figure 3:
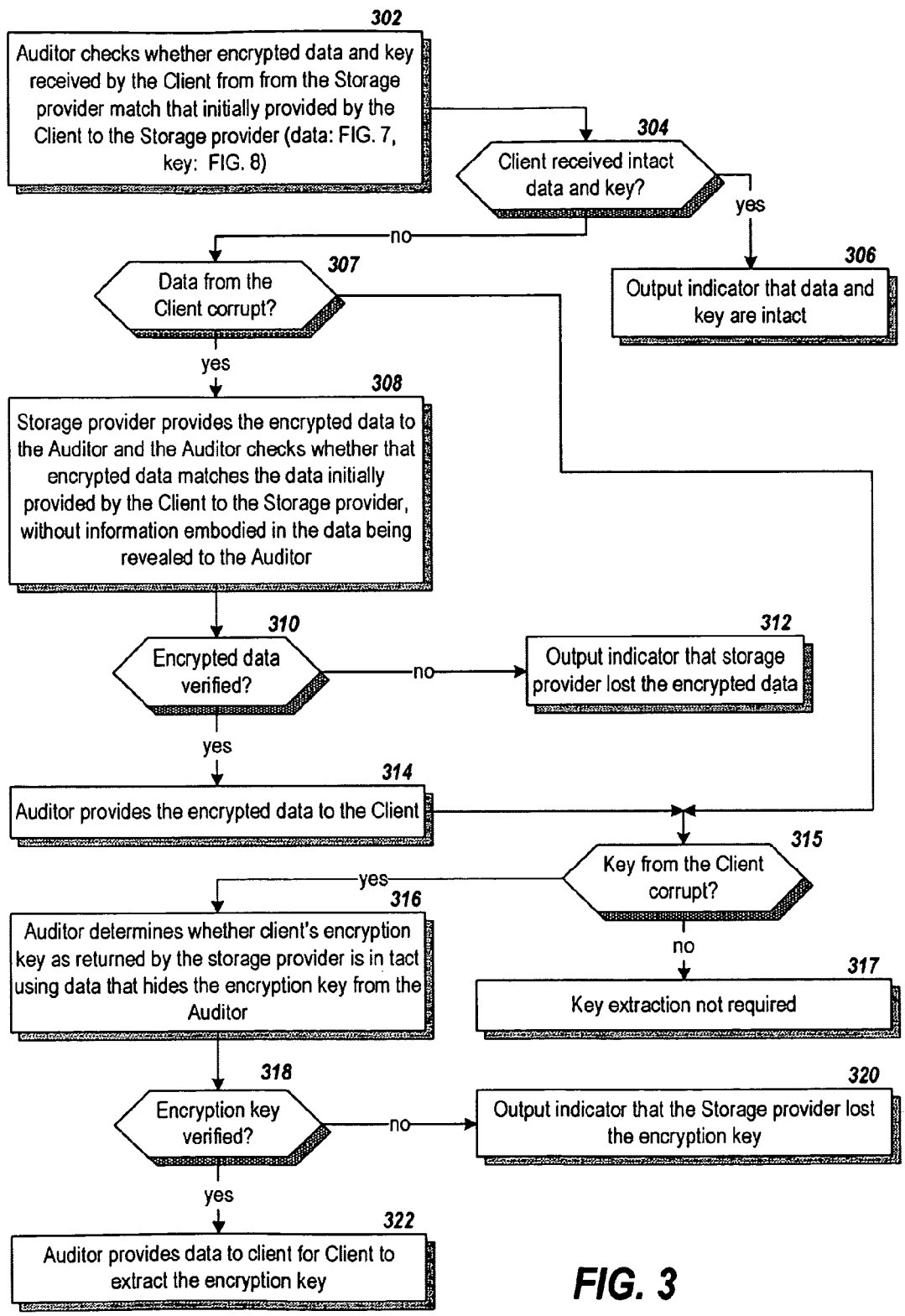
FIG. 3 is a flowchart of an example process for extracting the encrypted data and the encryption key stored by the storage provider through the auditor, which verifies their integrity, and returning them intact to the client in accordance with various embodiments of the invention.

FIG. 3 is a flowchart of an example process for verifying that the encrypted data and the encryption key returned by the storage provider for extraction by the client are in tact in accordance with various embodiments of the invention. The process generally has two phases In the first phase the auditor determines whether (1) the encrypted data and (2) the encryption key provided by the storage provider to the client are intact. If either the encryption key or encrypted data or both cannot be verified to be intact, the process moves to the second phase in which the unverified items are extracted. In the second phase, the items to be extracted are passed through the auditor such that (A) the auditor can check their consistency without the data being revealed to the auditor (B) the client can efficiently recover the data without storing any initial state derived from the data. If the encrypted data did not verify in the first phase, in the second phase, the encrypted data is passed to the auditor, who checks its consistency, and passes it to the client. If the encryption key did not verify in the first phase, in the second phase, an appropriately hidden version of the encryption key is passed to the auditor, who checks its consistency, and passes that version to the client. The client then recovers the original data by recovering the key and decrypting the encrypted data. Note, although the first phase speed-up extraction in the typical case when extraction succeeds, this first phase is entirely optional.

At optional step 302, the auditor uses the verification protocols described below to determine whether the encrypted data and encryption key that the storage provider returned to the client are intact. Using the protocol described below in reference to FIG. 7, the auditor interfaces with the client to determine whether the client is holding the same encrypted data as that which was initially submitted to the storage provider. Similarly, the auditor interfaces with the client as described in FIG. 8 to determine whether the encryption key is intact. Note, these protocols are one of many possible privacy preserving protocols that can be used in conjunction with extraction to verify that the client received the correct data. If the client-received encrypted data and encryption key are intact, decision step 304 directs the process to step 306 where the auditor outputs an indicator that specifies that the client has intact data.

Returning now to decision step 304, if the encrypted data or encryption key verification with the client failed, meaning either the client received corrupt encrypted data or corrupt encryption key from the storage provider or the client lied to the auditor, the process proceeds to decision step 307. Either one or both of the data and key may be found to be corrupt at step 302. Extraction of the data is performed only if the data is found to be corrupt. Likewise, extraction of the key is performed (step 316) only if the key is found to be corrupt. If the data is corrupt, the process begins extraction of the data at step 308. At step 308, the auditor extracts the encrypted data from the storage provider, with the storage provider providing the encrypted data to the auditor. The auditor checks whether that encrypted data matches the encrypted data initially provided from the client to the storage provider by checking that the original and new hash of the encrypted data match. Since the data is encrypted, the auditor cannot learn anything about the underlying data.

If the encrypted data from the storage provider is corrupt (hash of initial encrypted data does not match hash of current encrypted data), the process proceeds to step 312 where an indicator is output signaling that the storage provider lost the client's data. Otherwise, the auditor provides the encrypted data to the client at step 314.

Before extracting the key, the auditor checks whether the extraction is necessary at decision step 315. If at step 302 the auditor found the key reported by the client to be corrupt, the process proceeds to step 316 for key extraction. Otherwise, the process is complete at step 317 since key extraction is not required. At step 316, the key extraction phase commences with the auditor determining whether the encryption key provided by the storage provider is intact. As will be explained further in the description of the embodiments shown in FIGS. 9-11, the data provided by the storage provider hides the value of the encryption key from the auditor but can be used by the auditor for performing verification and provided to the client for extracting the value of the encryption key.

If the encryption key is not verified (decision step 318), at step 320 the auditor outputs an indicator that specifies that the encryption key is corrupt. Otherwise, at step 322, the auditor provides the data received from the storage provider to the client so that the client can extract the encryption key and decrypt the data.

Figure 4:
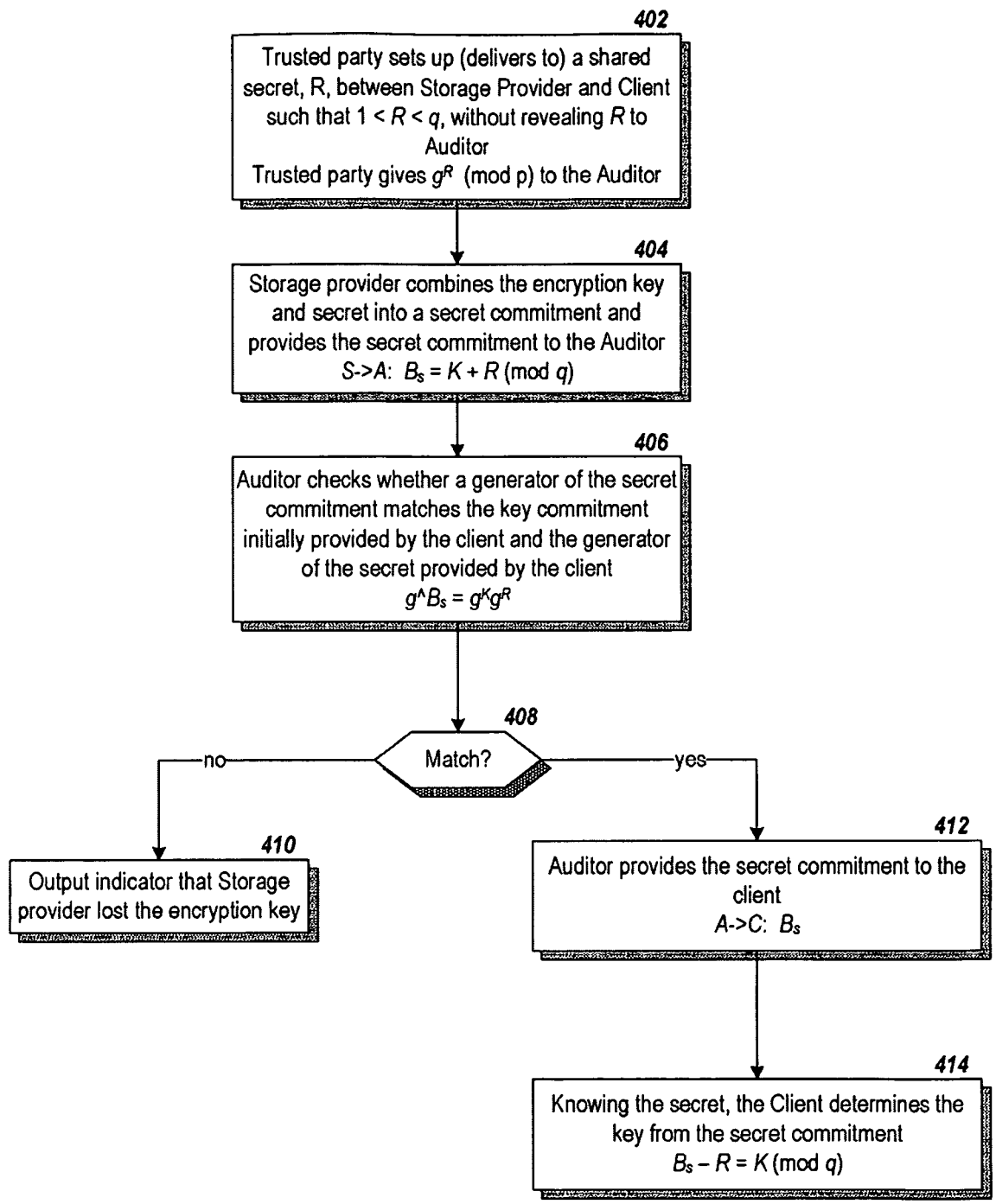
FIG. 4 is a flowchart of an example process for extracting the encryption key intact through the auditor to the client according to one embodiment of the invention.
Figure 5:
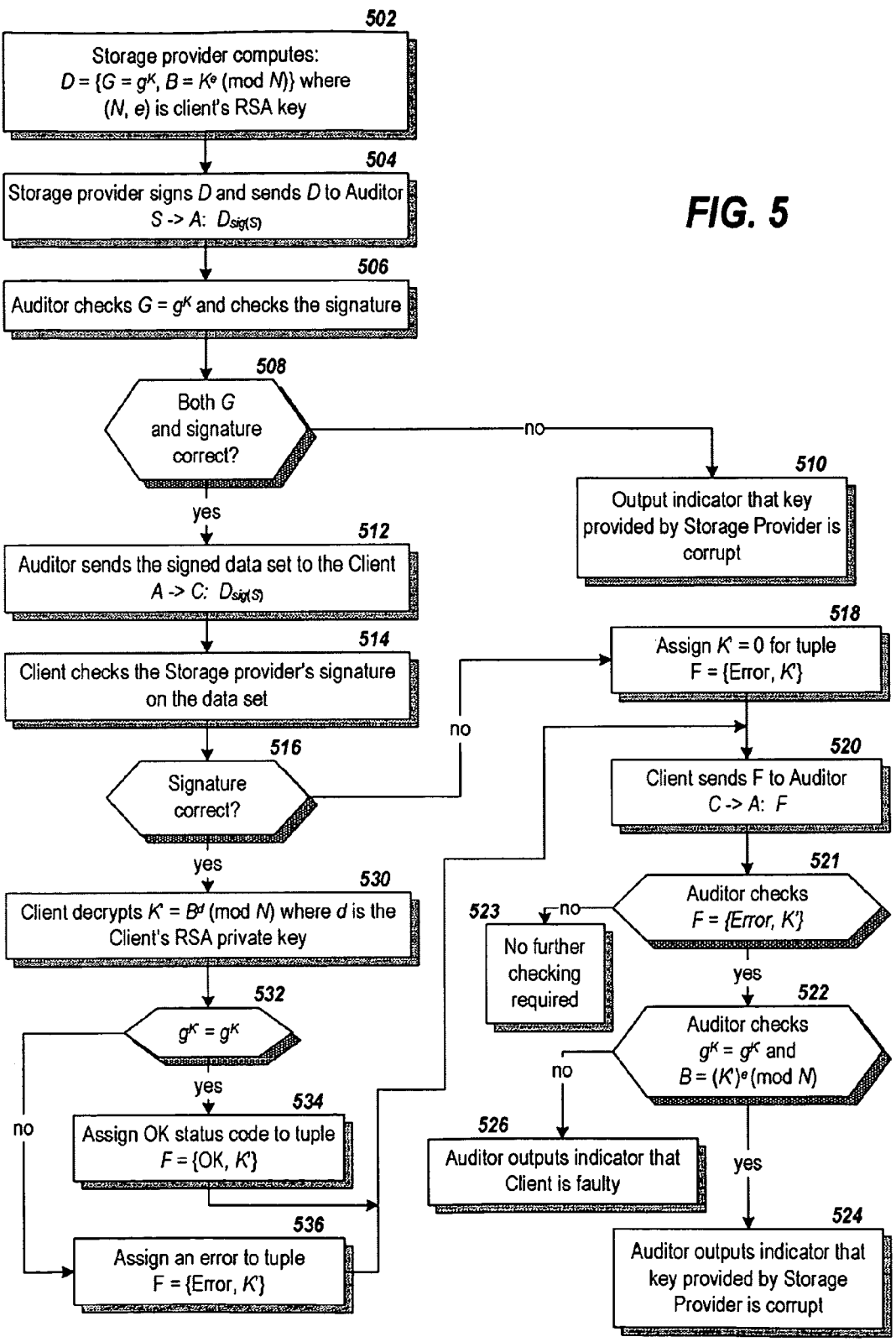
FIG. 5 is a flowchart of an example process that uses the PKI infrastructure for extracting the encryption key intact through the auditor to the client and determining whether the client or storage provider is interfering with the verification in accordance with another embodiment of the invention.
Figure 6:
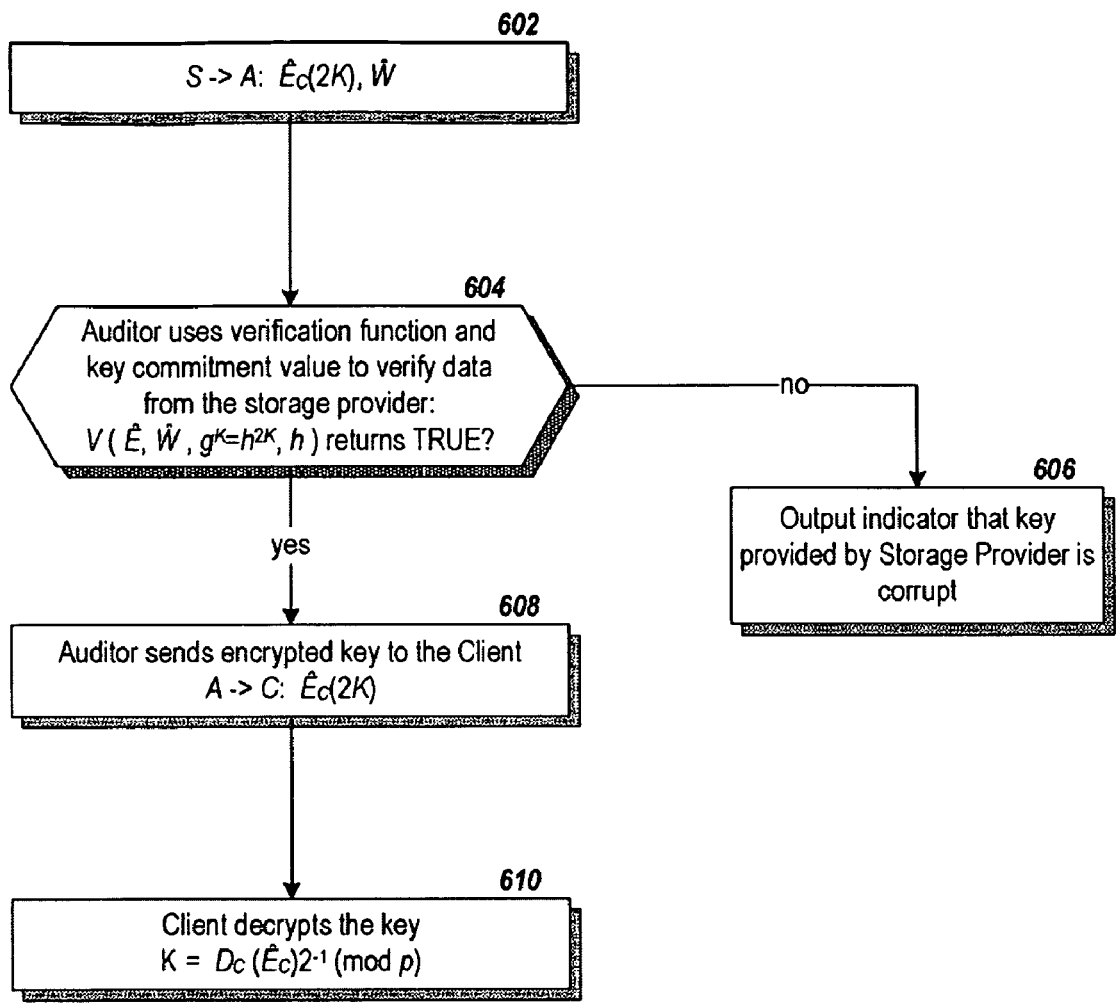
FIG. 6 is a flowchart of a third example process for extracting the encryption key intact through the auditor to the client in accordance with another embodiment of the invention.

FIGS. 4, 5, and 6 illustrate alternative methods for extracting the encryption key in accordance with various embodiments of the invention. FIG. 4 is a flowchart of a first example process for verifying that the encryption key returned by the storage provider for extraction by the client is intact according to one embodiment of the invention. The method of FIG. 4 relies on a trusted party other than the auditor, client, or storage provider. The trusted party generates and sends a shared secret, R to the storage provider and client and sends a secret-commitment, $g^R$ (mod p), to the auditor at step 402.

At step 404 the storage provider combines the secret value with the encryption key using the function $B_s = K + R$ (mod q) and sends $B_s$ (a "blinded" version of the encryption key) to the auditor. The auditor checks at step 406 whether a function of a generator g (as specified above) and the blinded version is equal to the product of the key commitment and the secret-commitment ($g^{B_s} = g^K g^R$).

If the values do not match (decision step 408), the auditor outputs an indicator that specifies that the storage provider lost the encryption key at step 410. Otherwise, the Auditor provides the blinded version of the encryption key to the client at step 412, and the client uses the secret value to extract the encryption key from the blinded version at step 414 using the relation, $B_s - R = K$ (mod q).

At step 412 the auditor will have determined that the storage provider provided an intact encryption key and will have done so without client involvement in the verification process. Therefore, the client will not have had any opportunity to obstruct verification of the encryption key.

The method of FIG. 4 involves an additional party for every extraction. An alternative embodiment shown in FIG. 5 uses publickey infrastructure (PKI). Since PKI exists to manage identities and allow authenticated and private communication, the PKI infrastructure is used in the extraction process. Although PKI also relies on trusted authorities, the trusted authorities are relied upon only for maintaining public-key certificates rather than providing a secret value for every extraction. Message M signed by S is denoted as, $M_{sig(S)}$.

FIG. 5 is a flowchart of an example process that uses the PKI infrastructure for verifying that the encryption key returned by the storage provider for extraction by the client is intact and determining whether the client or storage provider is interfering with the verification in accordance with another embodiment of the invention.

At step 502, the storage provider encrypts the encryption key using the original RSA public-key encryption method, denoted as: $B=K^e$ (mod N), where (N, e) is the client's RSA key. The storage provider includes the encrypted encryption key along with the key commitment value, $G=g^K$, in the data set, D, to be sent to the auditor. At step 504, the storage provider signs the data set D and sends the signed D to the auditor. Any cryptographically secure signature scheme may be used to sign the message D, for example, one based on RSA or El Gamal public-key encryption.

The auditor checks that the signature is correct and key-commitment matches the key-commitment originally provided during initialization at step 506. If either is incorrect (decision step 508), the auditor outputs an indicator that either the signature on the data set D is invalid or the key-commitment provided by the storage provider is corrupt at step 510. In either case, the auditor declares that the storage provider has lost the encryption key. If both are correct (decision step 508) the storage provider forwards the signed message D to the client at step 512.

At step 514, the client checks the signature. If the signature is not correct (decision step 516), the client assigns the value 0 to K' for the tuple F at step 518. The signature may be incorrect for a number of reasons. For example, if the auditor has a bug he could have sent a bad copy, or the auditor may be attempting to improperly learn something from the client. Since the client does not know what the auditor is attempting, an illegal value is sent for K'. The auditor will subsequently declare that the client is incorrect. This protocol preserves privacy in all cases, and correctly identifies the faulty party only if the auditor is not faulty. Thus, finding the client faulty is meaningless after the auditor forwards an inappropriate message D. At step 520, the client sends the tuple F to the auditor.

On the other hand, at decision step 516, if the client finds that the storage provider's signature is correct on D, then at step 530 the client decrypts the encryption key provided by the storage provider through the auditor ($K'=B^d$ (mod N), where the client's private key, d, is used for the decryption. At decision step 532, the client compares a function g and the decrypted encryption key to the key commitment value, $g^{K'}=g^K$. If the values are equal, the client is in possession of the correct key, K', and the client at step 534 assigns a status code "OK" to F indicating that the client has an intact decryption key. The client provides the tuple F to the auditor at step 520. Otherwise, at step 536, the client assigns to F an Error status code along with the value of the decrypted encryption key, K'. The process then proceeds to step 520 where the client sends F to the auditor for resolving whether the client or the storage provider is in error.

At decision step 521, the auditor checks whether the tuple F contains an error status code. Note that F may contain an OK status code as assigned at step 534. If the status code of F does not indicate an error, no further processing is required of the auditor, as shown by step 523. For an error status code, the auditor proceeds to decision step 522. At decision step 522, the auditor evaluates the expression: $g^K \cdot g^{K'}$ and $B=(K')^e$ (mod N). If the expression evaluates to true, then at step 524 the auditor outputs an indicator that the encryption key provided by the storage provider provided is corrupt. Otherwise, the client has returned a K' that is inconsistent with the B sent by the storage provider. Thus, at step 526, the auditor outputs an indicator that the client is faulty.

If the storage provider sends an incorrect key commitment, the auditor will catch the error at step 506. If the storage provider provides an incorrect key, the client will catch the error at step 532, and the auditor will catch the error at step, 522. Moreover, if the client sends a K', which is an incorrect decryption of B, then the auditor will catch the client in step 522. This latter holds because, with simple RSA encryption, the cipher-text of a message is the same on each invocation of encryption. The encryption key K is safe from being discovered by the auditor unless the auditor can break RSA or the discrete-log. To keep the key private, the protocol assumes the client never passes back a K' that is equal to K (as verified in step 532) to the auditor.

FIG. 6 is a flowchart of a third example process for verifying that the encryption key returned by the storage provider for extraction by the client is intact in accordance with another embodiment of the invention. The process of FIG. 6 applies verifiable encryption methods to the extraction of an encryption key through an auditor. The verifiable encryption is adapted from the teachings found in "Publicly Verifiable Secret Sharing" by Markus Stadler and published in 1996.

At step 602, $\hat{E}_C(2K)$ denotes the verifiable encryption of 2K (mod p) using the client's public key. The storage provider sends the verifiable encryption of 2K to the auditor, along with ·, which proves to the auditor that the encryption is of the discrete log of the key-commitment without revealing the key value.

At decision step 604, the auditor uses Stadler's verification function to determine whether the key provided by the storage provider is in tact. The general form of the verification function, V, is: $V(\hat{E}, ·, R, h)$, which returns either true or false. The parameter, R, is based on the following. Let $Log_h(R)$ (mod p) denote the discrete logarithm of R base h, where h is a generator of $Z_p^*$. A party P1 can send an encrypted value of the discrete log of R, $\hat{E}_c(\log_h(R))$, to party P2, along with a short witness, ·, that proves to P2 the encryption is of the discrete log without revealing the value of the discrete log. Since the verification function requires a generator of $Z^*p$ and h from initialization is such a value, the auditor uses $V(\hat{E}, W, g^K, h)$ to verify that the key was encrypted. Since $g=h^2$ and $g^K=h^{2K}$, V( ) will return true if the service correctly encrypted $2K(=\log_h(g^K))$ and false otherwise.

If the verification function returns false, then at step 606 the auditor outputs an indicator that the key provided by the storage provider is corrupt. Otherwise, the auditor sends the encrypted key, $\hat{E}_C(2K)$, to the client at step 608. At step 610, the client decrypts the encrypted encryption key.

It will be appreciated that in the embodiment of FIG. 6, there is no need for the storage provider to sign the message it sends to the auditor. Since the client does not reveal anything to the auditor, the client doesn't need to know whether or not the auditor is providing bad data. If the auditor is faulty, the client may receive bad data, but the protocol ensures nothing will be revealed to the auditor. The verification protocol requires the auditor to know the generator, h, which is the principal square root of g provided at initialization. Thus, the auditor should maintain it along with the other metadata.

Figure 7:
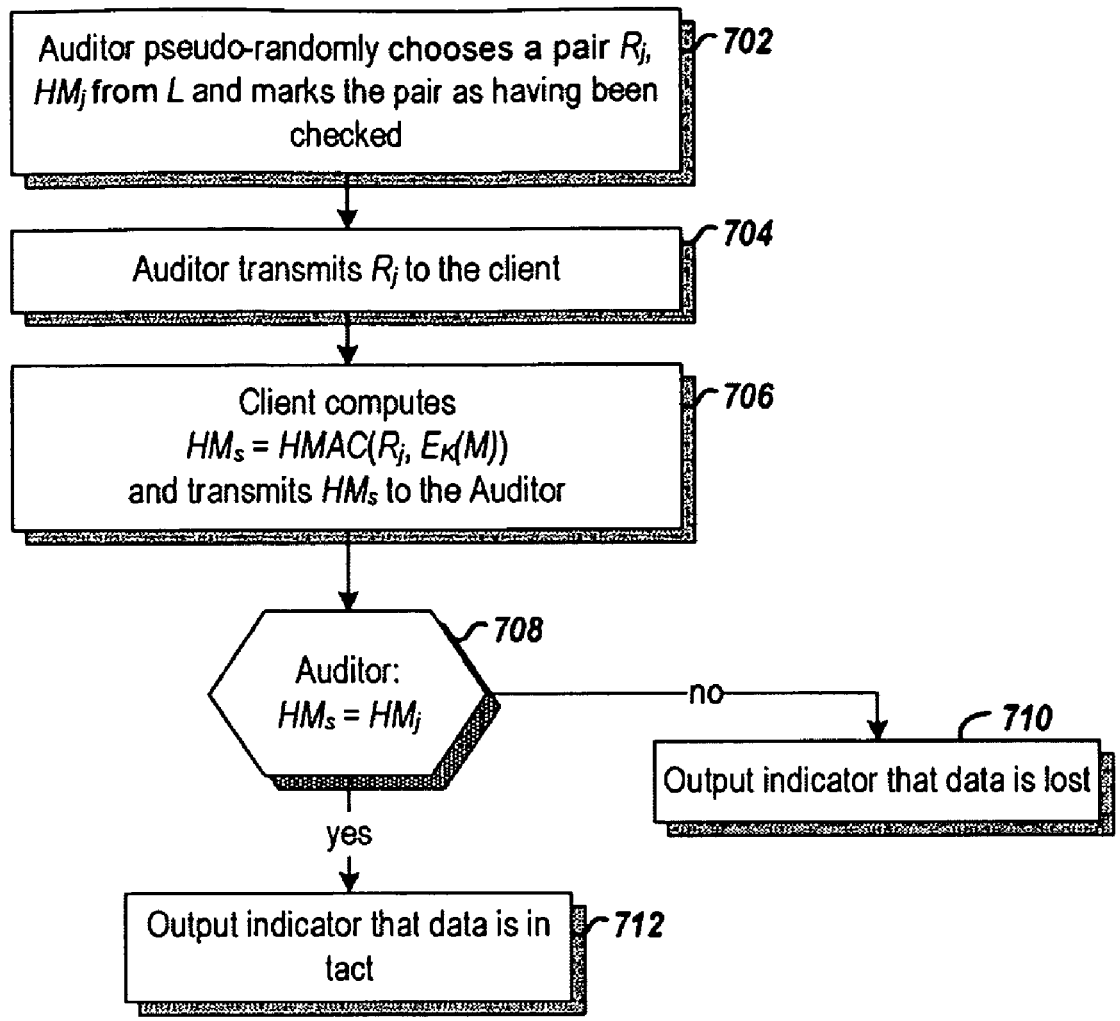
FIG. 7 is a flowchart of an example process containing further details for verifying the integrity of the client's version of the data returned by the storage provider in accordance with an example embodiment of the invention.
Figure 8:
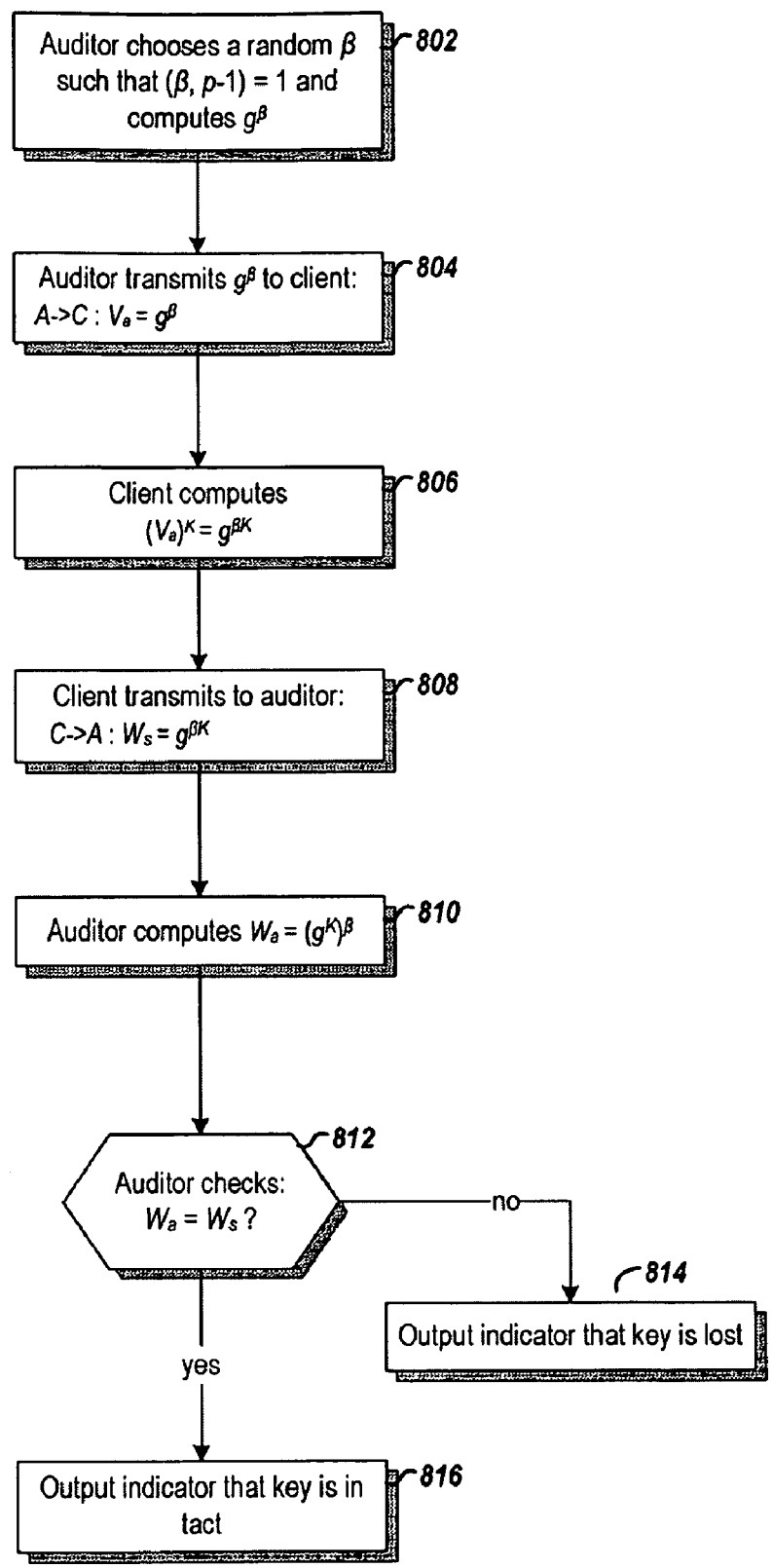
FIG. 8 is a flowchart of an example process for verifying the integrity of the encryption key returned by the storage provider to the client in accordance with an example embodiment of the invention.

At beginning of the extraction phase, the protocols optionally use privacy-preserving verification methods to verify that the encrypted data and encryption key are returned to the client are in tact. One such verification protocol is the following. Challenge-response protocols are used by the auditor to determine whether the client's version of the encrypted data set and encryption key are in tact. These challenge-response protocols perform the verification without revealing the data or the key in plaintext to the auditor. FIG. 7 shows an example process for verifying the encrypted data and FIG. 8 shows an example process for verifying the encryption key.

FIG. 7 is a flowchart of an example process containing further details for verifying the integrity of the encrypted data that the client received from the storage provider in accordance with an example embodiment of the invention.

At step 702 the auditor pseudo-randomly chooses a challenge-response pair $R_j$, $HM_j$ from L and marks the pair as having been used (or alternatively removes the pair from the set). At step 704 the auditor transmits the challenge code, $R_j$, to the client. The client, at step 706, computes a hash of the encrypted data set using the auditor-supplied $R_j$, denoted as: $HM_s = HMAC(R_j, E_K(M))$ with the same underlying digest, e.g. SHA-2. The client supplies $HM_s$ to the auditor.

At step 708 the auditor checks whether the clients hash of the encrypted data set equals the auditor-generated hash of the encrypted data set ($HM_s = HM_j$). If the hash values do not match, the client's version of the encrypted data set is corrupt, and at step 710 the auditor outputs an indicator (the "indicator" being data that indicates) that the storage provider has lost the client's data. If the hash values are equal, the auditor, at step 712, outputs an indicator that the clients encrypted data set is intact.

FIG. 8 is a flowchart of an example process for verifying the integrity of the encryption key returned by the storage provider to the client in accordance with one embodiment.

At step 802 the auditor chooses a random · such that $1 < \cdot < q$ and computes $g^{\cdot}$. At step 804 the auditor transmits $V_a = g^{\cdot}$ to the client, denoted as: A->C: $V_a = g^{\cdot}$.

The client, at step 806, computes $(V_a)^K = g^{\cdot K}$. At step 808 the client transmits $g^{\cdot K}$ to the auditor, denoted as: C->A: $W_s = g^{\cdot K}$.

Using its locally stored key commitment value $g^K$ (initially received from the client), and the · generated at step 802, the auditor computes $W_a = (g^K)^{\cdot}$ at step 810. At decision step 812 the auditor checks whether the auditor-computed $W_a$ is equal to the storage provider computed $W_s$. If the values are not equal, the version of the encryption key returned by the storage provider to the client is incorrect and at step 814 the auditor outputs an indicator that the key is lost. If the values are equal, the auditor at step 816 outputs an indicator that the encryption key returned by the storage provider to the client is intact. Alternatively, or in combination, the auditor may provide the indicator as a status code to the client and/or storage provider.

Those skilled in the art will appreciate that various alternative computing arrangements would be suitable for hosting the processes of the different embodiments of the present invention. For example, the processes may be implemented on single processor, multi-processor, parallel processor, or an arrangement of processors on a local area network. In addition, the processes may be provided via a variety of computer-readable storage media or delivery channels such as magnetic or optical disks or tapes, electronic storage devices, or as application services over a network.

The present invention is believed to be applicable to a variety of extraction and arbitration applications and has been found to be particularly applicable and beneficial in third-party extraction of client data maintained by a storage provider and arbitration of data retention contracts. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method, comprising:
  initializing a third party auditor with a first encrypted data set received from a client, the first encrypted data set to confirm that an initial data set stored by a storage provider on behalf of the client is intact, the third party auditor being different from the storage provider and the client;
  receiving a second encrypted data set at the auditor from the storage provider, the second encrypted data set not being extracted from the client, wherein the second encrypted data set hides information of the initial data set from the auditor;
  determining at the auditor whether the second data set matches the initial data set by applying a checking function on the second data set and the first data set;
  returning the second data set to the client in response to the initial data set matching the second data set, wherein the auditor is prevented from recovering the information specified by the second data set, and the client is relieved from having to store any state related to the initial data set and the second data set needed to recover the information specified by the initial data set; and
  in response to the initial data set not matching the second data set, outputting data indicative of data corruption.

2. The method of claim 1, wherein the initial data set includes an encryption key and an encrypted version of the initial data set encrypted with the encryption key; and wherein determining by the auditor includes:
  determining whether the encrypted version of the initial data set is corrupt without exposing unencrypted values of the encrypted version of the initial data set to the auditor; and
  determining whether the encryption key is corrupt without exposing a value of the encryption key to the auditor.

3. The method of claim 2, further comprising:
  recovering the encryption key at the client from the second data set; and
  decrypting data in the second data set at the client using the recovered encryption key.

4. The method of claim 2, wherein the determining whether the encryption key is corrupt includes:
  receiving from the storage provider and the client respective key-check values derived from the encryption key;
  determining from the received key-check values and the first data set, whether the storage provider failed to return an initial version of the encryption key intact or the client is obstructing the auditor with an invalid key-check value;
  in response to determining that the storage provider failed, outputting data indicative of storage provider failure; and
  in response to determining that the client provided an invalid key-check value, outputting data indicative of client obstruction.

5. The method of claim 2, wherein a first value in the first data set is generated from a hash function of the encrypted version of the data set, and the applying of the checking function includes generating a second data value from the hash function of the second data set and comparing the first data value to the second data value.

6. The method of claim 2, wherein the determining whether the encryption key is corrupt includes:
inputting a key commitment value to the auditor, wherein the key commitment value binds the storage provider to a value of the encryption key without revealing the encryption key to the auditor, and the key commitment value is a function of a generator for a cyclic group and the encryption key;
inputting a secret commitment value to the auditor, wherein the secret commitment value is a function of the generator and a shared secret value between the client and the storage provider, and the shared secret value is unknown to the auditor;
inputting a second encryption key to the auditor, wherein the second encryption key is based on the shared secret value;
determining by the auditor a key verification value as a function of the generator and the second encryption key is equal to a product of the key commitment value and the secret commitment value;
outputting data indicative of the storage provider having provided a invalid encryption key in response to the key verification value being not equal to the product of the key commitment value and the secret commitment value; and
outputting the second encryption key to the client in response to the key verification value being equal to the product of the key commitment value and the secret commitment value.

7. The method of claim 2, wherein the determining whether the encryption key is corrupt includes:
inputting a first key commitment value to the auditor, wherein the first key commitment value binds the storage provider to a value of the encryption key without revealing the encryption key to the auditor, and the key commitment value is a function of a generator for a cyclic group and the encryption key;
inputting to the auditor a first data set having a signature provided by the storage provider, wherein the first data set includes a second key commitment value and the encryption key encrypted with a public key of the client;
determining by the auditor whether the signature on the first data set is that of the storage provider and whether the second key commitment value equals the first key commitment value; and
outputting data indicative of one of the storage provider having signed the data set with an invalid signature or the second key commitment value being invalid in response to determining that the signature on the first data set is not that of the storage provider or the second key commitment value does not equal the first key commitment value.

8. The method of claim 7, further comprising outputting the first data set from the auditor to the client in response to the auditor determining that the signature on the first data set is that of the storage provider and the second key commitment value is equal to the first key commitment value.

9. The method of claim 8, further comprising:
decrypting, by the client, the encrypted encryption key in the first data set into a decrypted key value using a private key of the client;
determining a key verification value as a function of the decrypted key value;
comparing the key verification value to the key commitment value by the client; and
decrypting data in the second version using the decrypted key value by the client in response to the key verification value being equal to the key commitment value.

10. The method of claim 9 further comprising:
in response to the key verification value being not equal to the key commitment value, transmitting an error code and the decrypted key value from the client to the auditor;
determining by the auditor from the decrypted key value and the encryption key from the first data set as encrypted with the public key of the client, one of the client or storage provider having provided faulty data;
outputting data indicative of the client having provided faulty data in response to determining that the client provided faulty data; and
outputting data indicative of the storage provider having provided faulty data in response to determining that the storage provider provided faulty data.

11. The method of claim 2, further comprising:
inputting a first key commitment value to the auditor, wherein the key commitment value binds the storage provider to a value of the encryption key without revealing the encryption key to the auditor, and the key commitment value is a function of a generator for a cyclic group and the encryption key;
receiving by the auditor from the storage provider, an encrypted version of the encryption key, wherein the encrypted version is a discrete log of the key commitment value as generated using verifiable encryption;
determining by the auditor using a verification function of the verifiable encryption on the encrypted version of the encryption key, whether the encrypted version of the encryption key is corrupt; and
outputting data indicative of the encrypted version of the encryption key being corrupt in response to determining that the encrypted version of the encryption key is corrupt.

12. The method of claim 11, further comprising outputting the encrypted version of the encryption key by the auditor to the client in response to determining that the encrypted version of the encryption key is not corrupt.

13. The method of claim 1, further comprising:
determining at the auditor using the first data set, whether a third data set provided by the storage provider to the client has been corrupted from the initial data set; and
preventing exposure of information specified by the data set to the auditor while the auditor is determining whether the third data set is corrupt;
wherein the receiving of the second data set, determining a match of the second data set to the initial data set, and the returning of the second data set are bypassed in response to determining that the third data set is intact.

14. A tangible machine-readable storage medium storing machine-readable instructions which, when executed, cause a machine to at least:
initialize a third party auditor with an encrypted verification data set received from a client, the encrypted verification data set to confirm that an initial data set stored by a storage provider on behalf of the client is intact, the third party auditor being different from the storage provider and the client;

extract a second encrypted data set from the storage provider, the second encrypted data set not being received via the client, wherein the second version hides information specified by the initial data set from the auditor;

determine whether the second data set matches the initial data set by applying a checking function on the second data set and the verification data set;

return the second data set to the client in response to the initial data set matching the second data set, wherein the auditor is prevented from recovering the information specified by the initial data set and the second data set, and the client is relieved from having to store any state related to the initial data set and the second data set needed to recover the information specified by the initial data set; and in response to the initial data set not matching the second data set, output data indicative of data corruption.

15. The machine-readable medium of claim 14, further storing instructions which, when executed, cause a machine to:

determine whether at least one of the encrypted verification data set and the second encrypted data set is corrupt without exposing unencrypted values of the at least one of the encrypted verification data set and the second encrypted data set to the auditor; and determine whether an encryption key used to encrypt the at least one of the encrypted verification data set and the second encrypted data set is corrupt without exposing a value of the encryption key to the auditor.

16. The machine-readable medium of claim 15, further storing instructions which, when executed, cause a machine to:

recover the encryption key from the second data set by the client; and decrypt data in the second data set using the recovered encryption key by the client.

17. The machine-readable medium of claim 15, further storing instructions which, when executed, cause a machine to:

receive from the storage provider and the client respective key-check values derived from the encryption key;

determine from the received key-check values and the verification data set, whether the storage provider failed to return an initial version of the encryption key intact or the client is obstructing the auditor with an invalid key-check value;

in response to determining that the storage provider failed, output data indicative of storage provider failure; and in response to determining that the client provided an invalid key-check value, output data indicative of client obstruction.

18. The machine-readable medium of claim 15, wherein a first value in the verification data set is generated from a hash function of the encrypted version of the data set, and the applying of the checking function includes generating a second data value from the hash function of the second version of the data set and comparing the first data value to the second data value.

19. The machine-readable medium of claim 14, further storing instructions which, when executed, cause a machine to:

determine by the auditor using the verification data set, whether a third data set provided by the storage provider to the client has been corrupted from the initial data set; and prevent exposure of information specified by the data set to the auditor while the auditor is determining whether the third data set is corrupt;

wherein the receiving of the second data set, the determining of a match of the second data set to the initial data set and the returning of the second data set are bypassed in response to determining that the third data set is intact.

* * * * *